United States Patent
Darian

(10) Patent No.: US 8,701,938 B2
(45) Date of Patent: Apr. 22, 2014

(54) APPLICATOR FOR EXTRUDING A SEMI-SOLID FLOWABLE MATERIAL

(76) Inventor: Michael Eric Darian, Ambler, PA (US)

(*) Notice: Subject to any disclaimer, the term of this patent is extended or adjusted under 35 U.S.C. 154(b) by 13 days.

(21) Appl. No.: 13/446,567

(22) Filed: Apr. 13, 2012

(65) Prior Publication Data

US 2013/0270297 A1   Oct. 17, 2013

(51) Int. Cl.
*B67D 7/70* (2010.01)

(52) U.S. Cl.
USPC .......... 222/137; 222/390; 222/391; 222/132; 222/333; 222/386

(58) Field of Classification Search
USPC ............ 222/132, 137, 390–391, 333, 145.3, 222/160, 167, 386
See application file for complete search history.

(56) References Cited

U.S. PATENT DOCUMENTS

| | | | |
|---|---|---|---|
| 1,292,234 A | 1/1919 | Bausman | |
| 1,717,151 A | 5/1928 | Genova | |
| 1,713,585 A | 5/1929 | Wolf | |
| 4,915,695 A * | 4/1990 | Koobs | 604/191 |
| 4,923,706 A | 5/1990 | Binley | |
| 5,492,706 A | 2/1996 | Cockings | |
| 5,603,965 A * | 2/1997 | Daouse | 425/130 |
| 5,735,436 A * | 4/1998 | Schroeder et al. | 222/129.1 |
| 6,719,174 B1 * | 4/2004 | Swift | 222/333 |
| 6,739,779 B1 * | 5/2004 | Deeds | 401/47 |
| 6,874,657 B2 * | 4/2005 | Metzner et al. | 222/82 |
| 7,658,960 B2 * | 2/2010 | Thomas et al. | 426/516 |
| 7,950,549 B1 * | 5/2011 | Harris | 222/333 |
| 8,418,891 B1 * | 4/2013 | Harris | 222/333 |
| 2006/0273199 A1 * | 12/2006 | Amron | 239/333 |
| 2008/0041880 A1 * | 2/2008 | Babineau et al. | 222/146.5 |
| 2008/0089967 A1 | 4/2008 | Bourque | |
| 2009/0101673 A1 * | 4/2009 | Alioto et al. | 222/113 |
| 2009/0120959 A1 * | 5/2009 | So et al. | 222/132 |

* cited by examiner

*Primary Examiner* — Paul R Durand
*Assistant Examiner* — Jeremy W Carroll
(74) *Attorney, Agent, or Firm* — Howson & Howson LLP

(57) ABSTRACT

An applicator for extruding strings of cake icing or other flowable semi-solid material comprises a longitudinally slotted screw rotated in a fixed nut and thereby advanced longitudinally in a tube, and a rotating nozzle assembly having a partition extending into the slot or slots of the screw whereby the nozzle assembly rotates with the screw as the screw advances. Pistons formed at an end of the screw fit cylinders formed by the interior wall of the tube and the partition to eject icing through one or more nozzles of the rotating nozzle assembly.

14 Claims, 6 Drawing Sheets

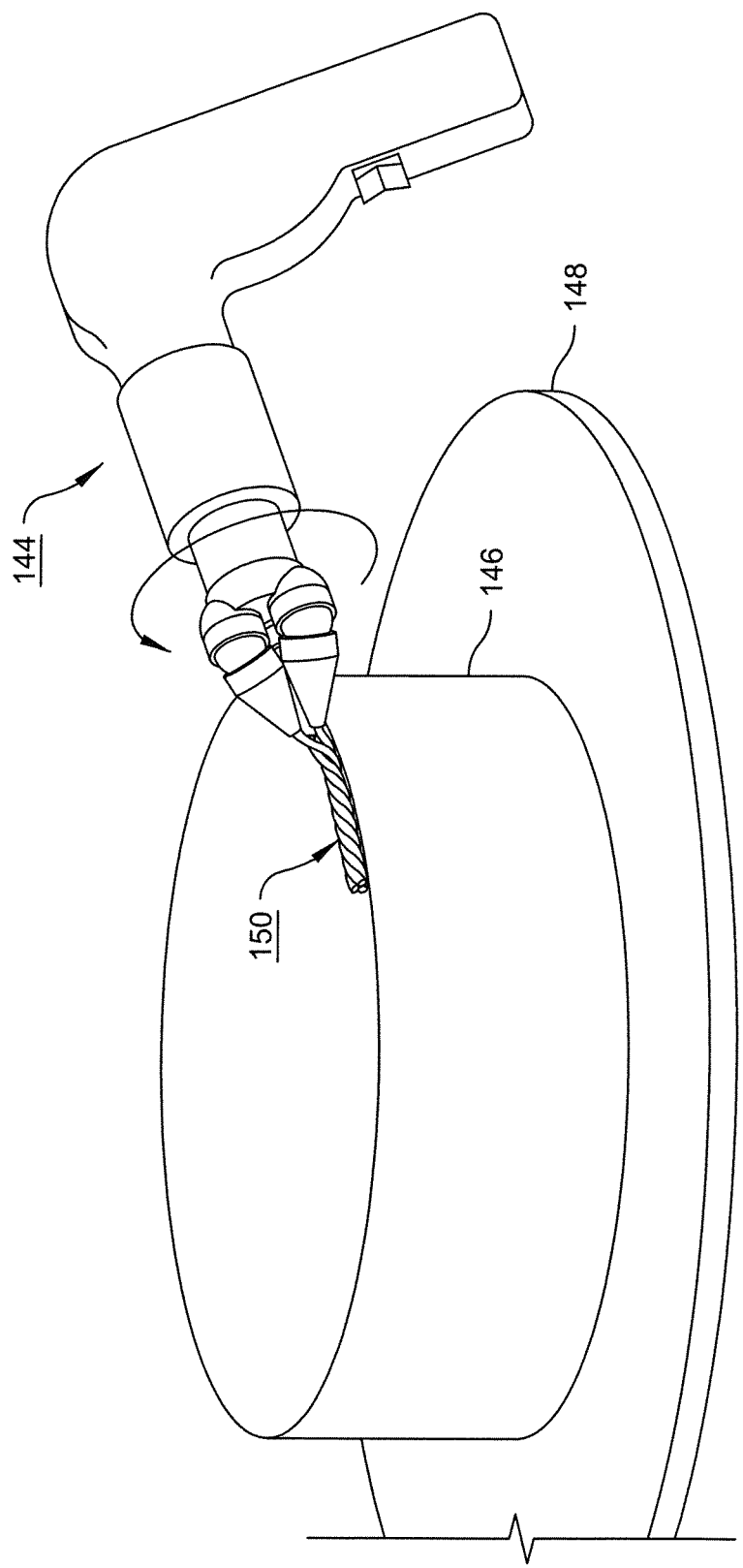

APPLICATOR FOR EXTRUDING A SEMI-SOLID FLOWABLE MATERIAL

FIELD OF THE INVENTION

The invention is an apparatus and method for extruding a semi-solid flowable material, having utility in the field of cake decoration, and potential uses in the production of other edible products as well as in the production of various decorative products. The term "semi-solid flowable material" as used herein refers to a material that is capable of being extruded through a nozzle upon the application of pressure at ambient temperature, but sustaining its shape when the applied force is limited to gravitational force. More particularly, the invention relates to the application of a semi-solid flowable material in such a way that the extruded product is twisted, and to variations in which two or more strings of extruded product are twisted about one another to form intertwined helical strands, which can be of different colors, or of different thicknesses, or both.

BACKGROUND OF THE INVENTION

In cake decorating, after a uniform layer of icing is applied, the cake is often trimmed with strings of icing applied by means of an extruder. The extruder can be in the form of a flexible bag having an attached nozzle though which icing in the bag is forced by manual squeezing of the bag. Other common forms of extruders include an extruder comprising a cylindrical chamber, an outlet nozzle through which icing flows from the interior of the cylindrical chamber, and a plunger, movable axially in the chamber, for applying pressure to the icing and thereby extruding the icing through the nozzle. In some extruders, the plunger is operated manually. In others, the plunger is motor-driven. The nozzles can have apertures configured to produce strings of icing of various sizes and cross-sectional shapes. For example, the nozzle aperture can be designed to extrude a string of icing in the form of a flat ribbon, or one having a star-shaped cross-section.

Extruders have also been designed with rotating nozzles for producing twisted strings of icing. For example United States Patent Publication 2008/0089967, published Apr. 17, 2008, describes a piping bag having a rotatable nozzle. Other extruders have been devised for dispensing icing through plural adjacent nozzles that can rotate about a central axis to produce a rope-like string of icing. Examples of such extruders are described in U.S. Pat. Nos. 7,713,585, granted May 21, 1929, 5,492,706, granted Feb. 20, 1996, and 5,603,965, granted Feb. 18, 1997. Despite the developments exemplified by the above-mentioned patents and patent publication, a need remains for a simple and easy-to-use extruder capable of delivering a twisted string of icing of uniform quality, consisting of a single strand delivered through a single nozzle, or plural strands delivered through two or more nozzles and twisted about one another.

SUMMARY OF THE INVENTION

Briefly, the invention is an extrusion applicator in which semi-solid material is delivered through a rotating nozzle assembly by a pump. The nozzle assembly and pump are mechanically interconnected for simultaneous operation whereby, as a motive force is applied to the pump to operate the pump, the same motive force rotates the nozzle assembly.

In an embodiment of the invention, a rotatable member is arranged to transmit operating power both to the nozzle assembly and to the pump. In a preferred embodiment, the pump includes a screw mechanism, and the nozzle assembly is coupled to the screw mechanism so that the nozzle assembly rotates upon operation of the screw mechanism.

In the preferred embodiment, the nozzle assembly is mounted for rotation about a discharge axis, and has at least one discharge opening. Each discharge opening is oriented to discharge flowable material along the discharge axis. However, the discharge openings are not necessarily aligned with the discharge axis, and can be offset from, and directed obliquely toward, the discharge axis. Even in the case of a nozzle assembly having a single discharge opening, the opening can be offset from, and directed obliquely toward, the discharge axis.

The pump comprises, for each discharge opening, at least one cylinder in communication with the discharge opening and a piston movable in the cylinder for exerting pressure on flowable material therein to cause the material to be discharged through the discharge opening. The term "cylinder" as used herein is not limited to a circular cylinder, and can be any straight tubular structure having a uniform transverse cross-section such that a piston having a conforming cross-sectional shape can slide therein while maintaining contact with, or closely spaced relationship with, the interior wall of the cylinder.

The pump drive comprises a relatively rotatable screw and nut having mating threads. The screw extends along a screw axis, and the pump drive is connected to each piston for moving the piston in its cylinder in response to relative movement of the screw and nut along the screw axis.

The rotatable member, which can be a shaft of a hand crank, the shaft of an electric motor, or any of various devices for transmitting torque, is mechanically connected both to the nozzle assembly and to the pump drive, and simultaneously imparts rotation to the nozzle assembly while imparting relative rotation to the screw and nut, so that the nozzle assembly rotates as the pump causes flowable material to be discharged through each discharge opening. Rotation of the nozzle assembly imparts a twist to the flowable material as it is discharged.

In an embodiment of the applicator, it is the screw of the pump drive that is coupled to the nozzle assembly so that the screw rotates with the nozzle assembly. The screw axis can coincide with the discharge axis about which the nozzle assembly rotates.

The screw axis of the applicator preferably coincides with the discharge axis and the screw extends axially within a rotatable housing having a cylindrical, inner wall coaxial with the screw. This cylindrical inner wall is preferably, although not necessarily, in the form of a circular cylinder. The nozzle assembly is also preferably located at one end of the housing and rotatable with the housing. A portion of the screw extending from a first end thereof is longitudinally divided into at least two parts, so that adjacent parts of the screw are separated by a space composed of at least one longitudinal slot. A partition extends along the direction of the discharge axis into the space between the parts of the piston, and has edges that meet the inner wall of the housing. Thus, the partition and the inner wall of the housing cooperate to form sector-shaped cylinders, each constituting a cylinder of the pump. Each piston is constituted by a divided part of the first end of the screw. The screw is rotatable by the rotatable member, and axially movable along the partition. The rotatable member imparts rotation to the nozzle assembly by rotating the partition, which can be fixed to the nozzle assembly.

In an embodiment of the invention, the partition has a Y-shaped cross-section, and divides the interior of housing into three sector-shaped cylinders. In this embodiment the screw is divided longitudinally into three parts, one of the three parts extending into each of the three sector-shaped cylinders.

In the preferred embodiments, a first of two opposite ends of the housing is located adjacent the discharge opening, the nozzle assembly is removably connected to the first end of the housing, preferably by cooperating threads formed on the first end of the housing and on the nozzle assembly. If the partition is fixed to the nozzle assembly, it can be removed with the nozzle assembly, facilitating cleaning of the cylinders. The removability of the partition with the nozzle assembly also makes it possible to replace the partition with one having another configuration, e.g., to replace a flat partition with a Y-shaped partition. The screw can also be replaced when the partition is replaced.

Although a flat or Y-shaped partition, or one having another configuration, can be used with a nozzle assembly having a single discharge opening, it can also be used with a nozzle assembly having plural discharge openings. Where the nozzle assembly has at least two discharge openings, and a corresponding number of cylinders, each cylinder can be in communication with a different one of the discharge openings.

In an embodiment of the applicator in which the nozzle assembly has at least two discharge openings, the discharge openings can be oriented for discharge of flowable material in oblique relation to the discharge axis. The openings can be oriented for discharge of flowable material toward the discharge axis, and can be formed in plural nozzles, each of which is angularly adjustable.

BRIEF DESCRIPTION OF THE DRAWINGS

FIG. 1A is an enlarged auxiliary view showing details of an area outlined by a broken line in FIG. 1;

FIG. 8 is a perspective view showing the applicator of the third embodiment in use.

DETAILED DESCRIPTION OF THE PREFERRED EMBODIMENTS

Figure 1:
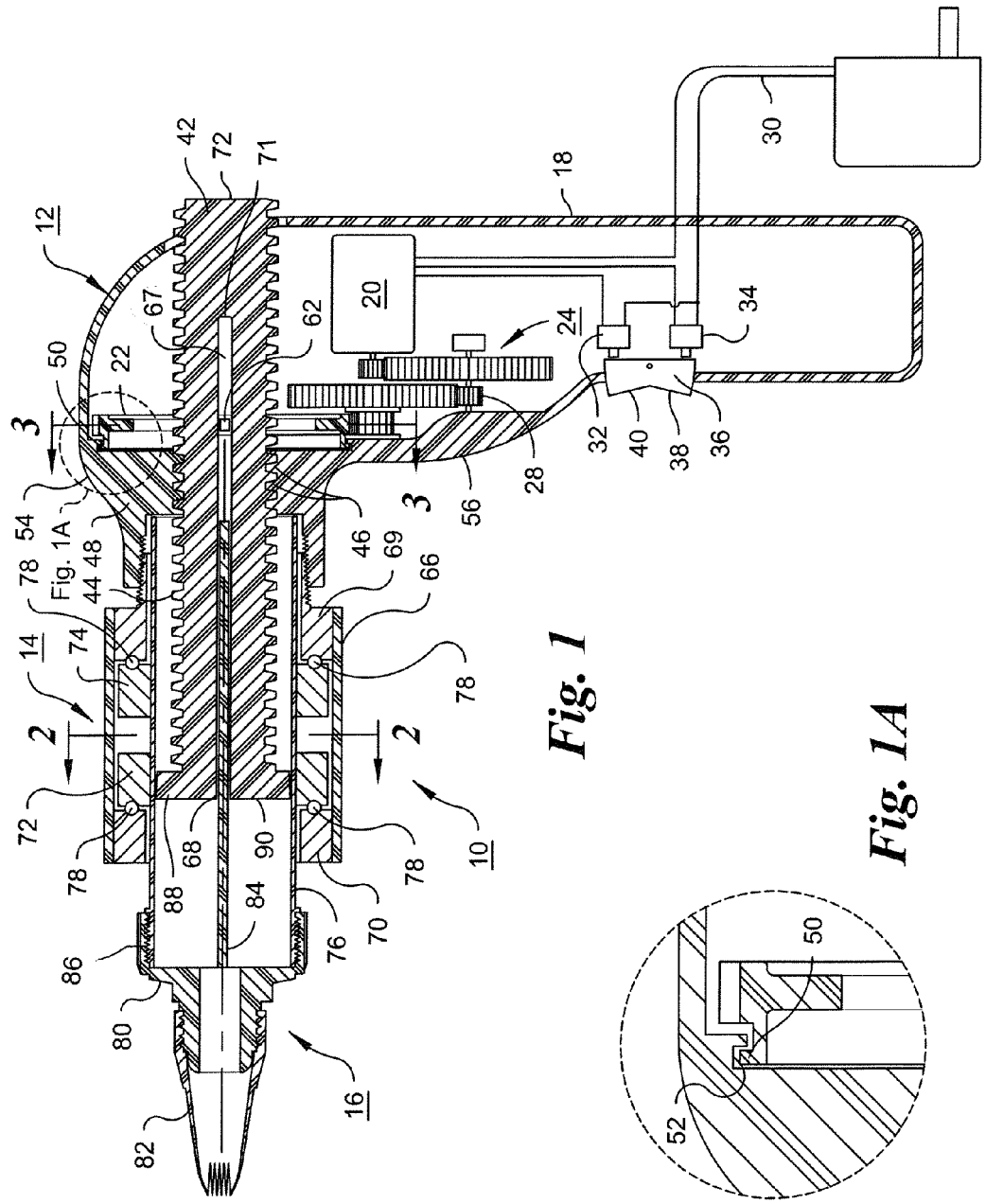
FIG. 1 is a longitudinal cross-sectional view of an applicator according to a first embodiment of the invention.

As shown in FIG. 1, a first embodiment of the invention is an applicator 10 comprising a drive unit 12, a pump section 14, and a nozzle assembly 16. The drive unit includes a hollow casing 18 having a handle. Inside the handle, a reversible motor 20 is arranged to rotate a rotating member 22 through a speed-reducing gear train 24. Member 22 (also shown in FIG. 3) is in the form of a large diameter gear, having teeth 26 in mesh with the teeth of a pinion 28 of the gear train.

The motor 20 is powered by an external, low voltage, power supply 30 through momentary switches 32 and 34, which are alternatively closed by operation of a rocker 36 on the handle. Pressing lower surface 38 on the rocker causes the shaft of the motor to rotate in one direction, and pressing upper surface 40 on the rocker causes the shaft to rotate in the opposite direction. The direction of rotation of rotatable member 22 can therefore be reversed.

An elongated screw 42 extends though an opening in the center of rotating member 22. Its threads 44 mesh with threads 46 of a nut 48 formed in an opening of the drive unit 12. As the screw rotates, it therefore moves axially in one direction or the other depending on its direction of rotation.

Figure 3:
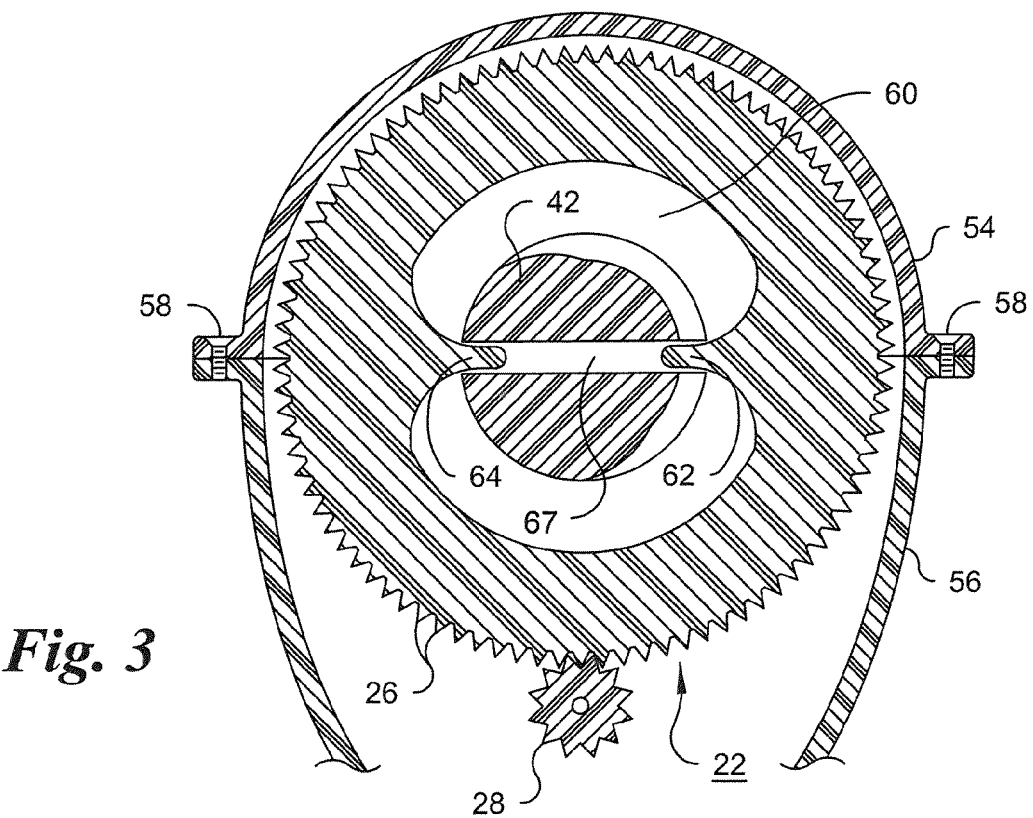
FIG. 3 is a cross-sectional view taken on plane 3-3 in FIG. 1, showing the drive mechanism for rotating the two-part screw of the first embodiment.

The rotating member 22 is formed with an annular flange 50, which extends radially outward, fitting into an annular slot 52 formed in the drive unit 12, as shown in FIG. 1A. The annular drive unit 12 is composed of an upper part 54 and a lower part 56 which are flanged and held together by fasteners 58 as shown in FIG. 3. The flange 50 of rotating member 22 can be inserted into the slot while the upper and lower parts are separate from each other. Although not shown in FIG. 1, in a modified version of the applicator, the drive unit can be constructed so that the part of the drive unit in which the nut is formed is unitary, the rotating member is retained by opposed semi-circular flanges formed on separate elements each secured to the unitary part of the drive unit, and housed in an enclosure which is also attached to the unitary part of the drive unit.

As shown in FIG. 3, the central opening 60 in rotating member 22 has two opposed protrusions 62 and 64, extending radially inward toward the center of the rotating member. The screw 42 has an elongated slot 67, extending from a front end 68 to a location 71 near the rear end 72 of the screw. The slot 67 extends diametrically across the screw, and receives both of the two opposed protrusions 62 and 64, so that the screw rotates with rotating member 22. Thus, as the motor 20 drives the rotating member 22 through the speed reducing gear train 24, the screw rotates in nut 48, and moves forward or rearward, depending on its direction of rotation.

The pump section 14 comprises a cylindrical sleeve 67 secured at one end to a ring-shaped fitting 69, having a threaded protrusion removably threaded into the casing of the drive unit. Another ring-shaped fitting 70 is secured at the opposite end of the sleeve 66. These fittings 69 and 70 cooperate with rings 72 and 74 on a hollow tube 76, and with balls 78, forming a bearing in which the tube 74 can rotate. The bearing ensures that the tube 76 rotates on an axis that is in fixed relationship to the casing of the drive unit, and is capable of sustaining thrust imparted to the tube by the pressure exerted by the screw on flowable material inside the tube.

The nozzle assembly 16 is removably secured by threads to an end of tube 76 that projects from sleeve 66, and includes a base 80 that is threaded to the end of the tube, and a nozzle 82 removably connected to the nozzle base 80. The nozzle can be any one of a variety of conventional icing nozzles of the kind used with icing bags or other icing applicators.

Figure 2:
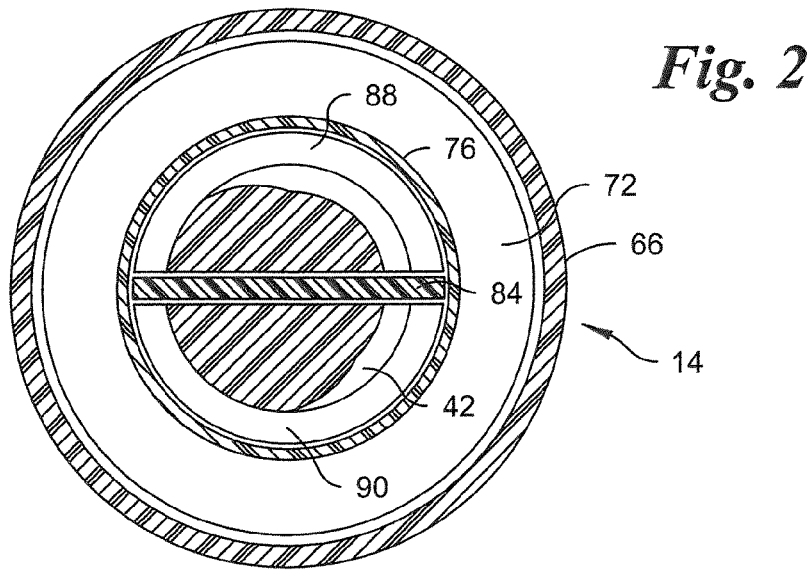
FIG. 2 is a cross-sectional view taken on plane 2-2 in FIG. 1.

A partition 84, in the form of a flat strip, is fixed to the removable nozzle base 80 and extends axially into the tube 76 to a location adjacent the nut 48. The partition 84 extends diametrically across the interior of the tube as shown in FIG. 2, either contacting the inner wall of the tube, or coming into such close proximity to the inner wall of the tube as to impede passage of semi-solid flowable material from one side of the partition to the other. A spacing of 1 or 2 mm at the long edges of the partition will generally impede flow of most semi-solid flowable materials sufficiently. Furthermore, because the pressures in the flowable materials on both sides of the partition will usually be approximately equal, the equality of pressure will also impede flow of material from one side of the partition to the other.

The partition extends into the slot 67 of the screw 42 as shown in FIGS. 1 and 2, and preferably has a thickness only slightly less than the width of the slot. Because the partition fits into the slot in the screw, rotation of the screw will impart torque to the nozzle assembly, causing the nozzle assembly 16 and the tube 76 to rotate along with the screw. Any clearance between the partition and the walls of the slot in the screw should be small to prevent excessive flow of flowable semi-solid material into the slot.

The direction of the threads 86 by which the nozzle base is secured to the tube 74 should be such that the connection between the nozzle base and the tube becomes tighter as the tube rotates in a direction that causes the end 68 of the screw to move toward the nozzle assembly. As an alternative to threads, in order to avoid overtightening, or loosening of the nozzle assembly during twisting, a bayonet-type, twist and lock, connection, or any of various other connection means, can be utilized to connect the nozzle base to tube 74.

The end 68 of the screw is formed on a split circular enlargement composed of parts 88 and 90, each integral with one of the two parts of the screw. The two parts of the enlargement serve as pistons, and the enlargement has a diameter such that it is in sliding contact with, or in close proximity to, the inner wall of the tube 76. Any gap between the inner wall of the tube and the periphery of a piston should be small to avoid flow of material past the piston and into the space surrounding the screw. Generally, the size of the gap should be less than approximately 1 mm.

The applicator of FIGS. 1-3 can be operated in the following manner. First, if the pistons are not already withdrawn to a location near the proximal end of tube 76, the motor 20 is operated by depression of the upper surface 40 of the rocker 36 to cause the screw to rotate in a direction such that it moves rearward, that is, toward the right in FIG. 1. The pump section 14 is rotated to remove it from the drive unit 12. The interior of tube 76 of the pump section can then be filled with icing or other semi-solid flowable material, by the use of a suitable device such as a conventional plunger-type applicator. The cylindrical spaces on both sides of the partition 84 can be filled with icings having different colors or other different properties. Alternatively, both cylindrical spaces can be filled with the same icing composition.

After having been charged with icing, the pump section is reattached to the drive unit, and the applicator can then be operated by depression of surface 38 of the rocker switch. As the motor operates, the screw 42 simultaneously rotates and moves forward in tube 76, forcing icing out through the opening of nozzle 82. Because the nozzle base 80 is fixed to the partition, and the partition extends into slot 67 of the screw, the nozzle and the tube 76 to which the nozzle and nozzle base are attached, rotate with the screw. Consequently, the icing extruded through the nozzle twists as it is ejected, forming a twisted string. If the icings on opposite sides of the partition are of different colors, a string of icing composed of two intertwined helices of different colors is produced. In general the two different icings will only partially merge in the space within the nozzle 82 and the nozzle base 80, and consequently the twisted, two-color, string can be produced. However, if desired, the partition 84 can be extended into and even beyond the passage in the nozzle base 80 to minimize merging of the two charges of icing.

In the case in which the charges of icing on both sides of the partition 84 are the same, a decorative twisting pattern can still be produced if the nozzle opening is offset slightly from its axis of rotation, or formed with serrations or in another configuration that imparts a non-circular shape to the extruded string of icing.

When the charge of icing is exhausted, the applicator can be taken apart by rotating the screw 42 in the direction such that it is withdrawn from the tube 76, and removing the pump section 14 from the drive unit 12. The tube can then be recharged with icing. Alternatively, the nozzle 82 can be disconnected from the nozzle base 80, and the nozzle base can be disconnected from the tube 76. The components can then be cleaned and stored for future use.

Figure 4:
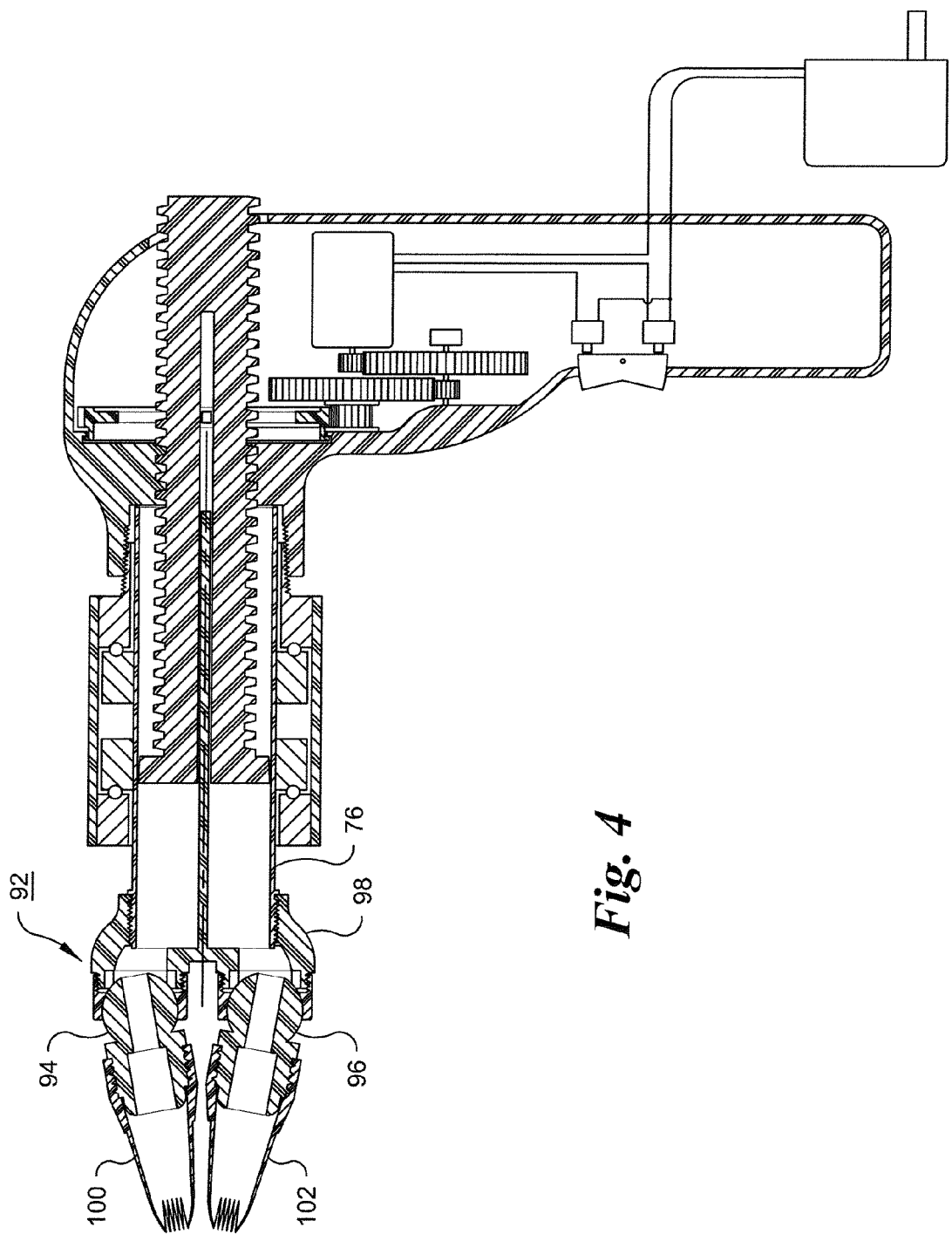
FIG. 4 is a longitudinal cross-sectional view of an applicator according to a second embodiment of the invention.

In the alternative embodiment illustrated in FIG. 4, the drive unit and pump are identical to the drive unit and pump of the embodiment in FIGS. 1-3. The nozzle assembly, however, comprises two nozzles offset from the axis of rotation, and angularly adjustable so they can be oriented for discharge of flowable material in oblique relation to, a discharge axis which is the same as the axis of rotation of the nozzle assembly.

The nozzle base 92, includes a pair of articulating adapters 94 and 96, each connected by a ball joint to a fitting 98 threaded onto the tube 76. Nozzles 100 and 102 are removably connected respectively to the adapters 94 and 96.

In the embodiment of FIG. 4, two separate strings of icing are extruded and directed obliquely toward the discharge axis. As the strings are extruded, they wind about each other, forming a twisted pair of strings. The shape of the twisted pair can be adjusted both by adjusting the directions of the nozzles and by controlling the rate at which the applicator moves relative to the cake being decorated. If desired, the two nozzles can be different from each other. For example one of them can be configured to produce a string of icing narrower than the string of icing produced by the other.

Figure 5:
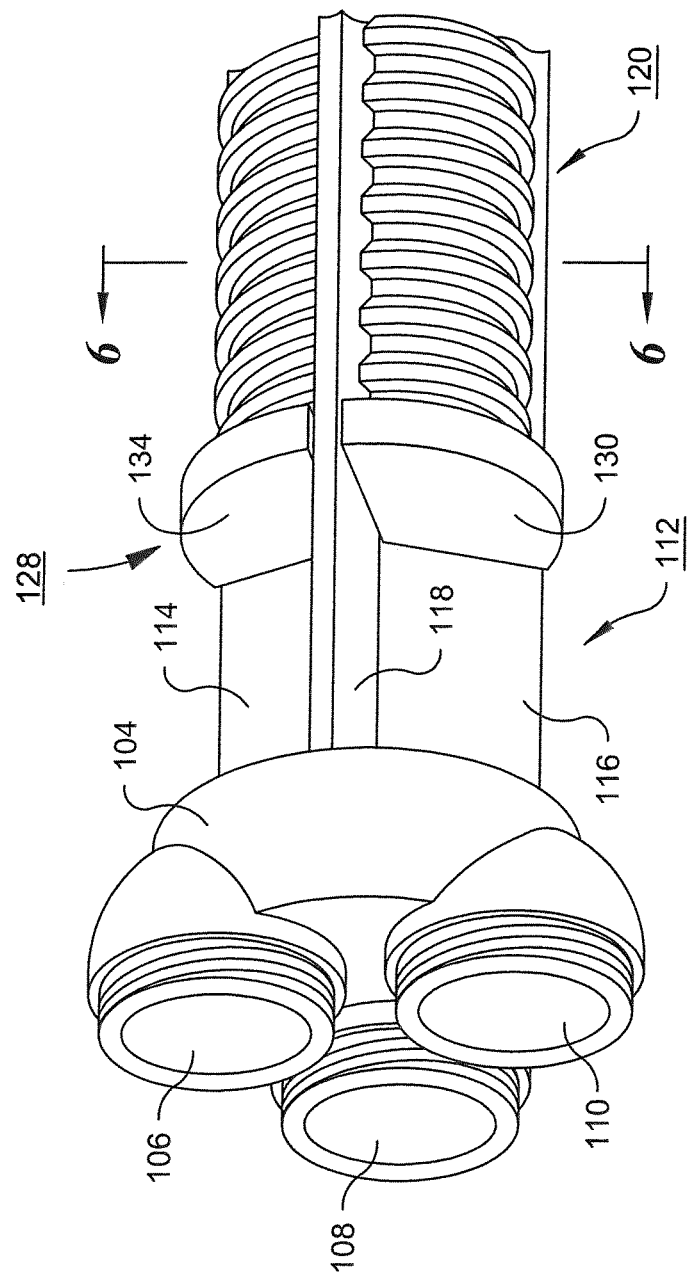
FIG. 5 is a perspective view showing the nozzle fitting, a Y-shaped partition, and plunger of an applicator in accordance with a third embodiment.
Figure 6:
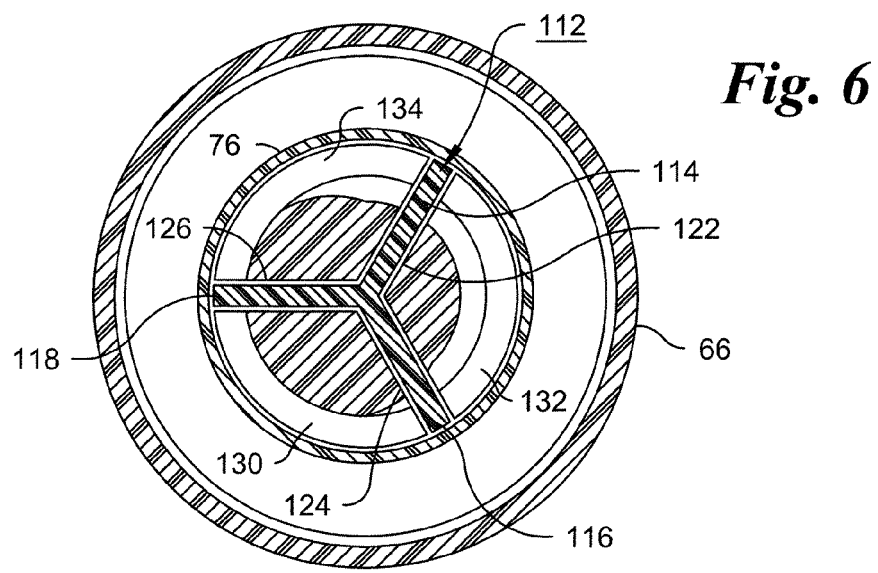
FIG. 6 is a cross-sectional view taken on plane 6-6 in FIG. 6.
Figure 7:
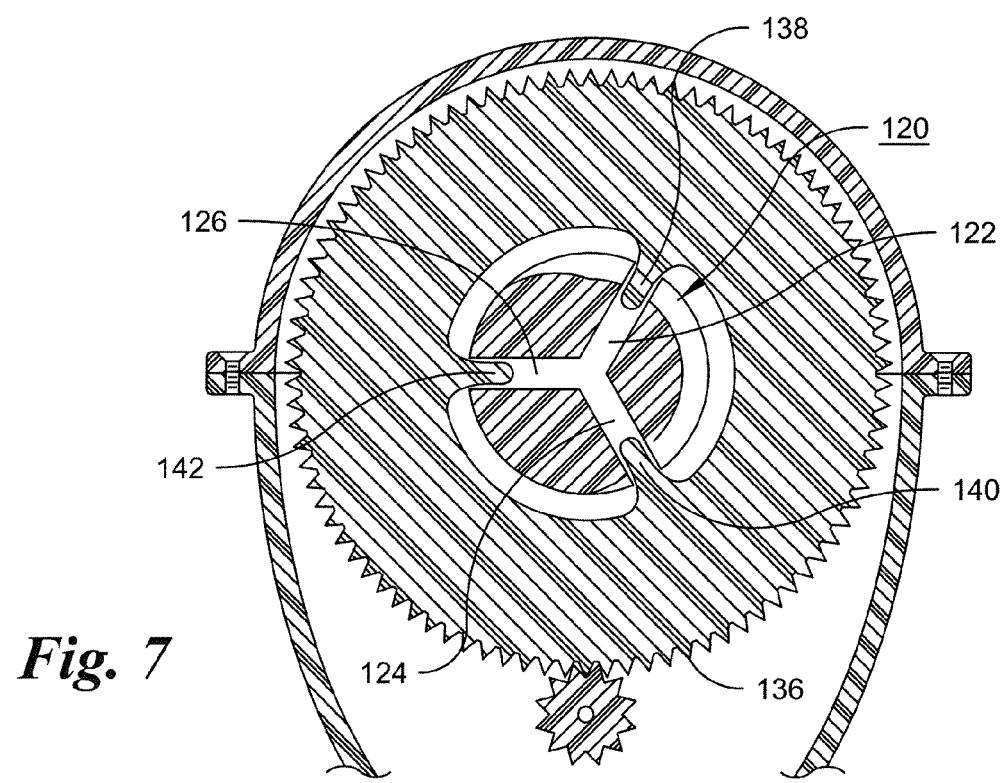
FIG. 7 is a cross-sectional view, corresponding to FIG. 3, but showing the drive mechanism for rotating the three-part screw of FIG. 5.

In a third embodiment, illustrated in FIGS. 5-7, a fitting 104, which is part of a nozzle base, has three passages (not shown), each communicating with one of three ball-joint sockets 106, 108 and 110. These ball joint sockets are equidistant from a rotation axis and uniformly spaced from one another about the rotation axis. Angularly adjustable adapters, and nozzles, similar to those shown in FIG. 4 are connected to the fitting 104.

A three part partition 112, having a Y-shaped transverse cross-section composed of three parts 114, 116 and 118 as shown in FIG. 6, is fixed to, and extends proximally from, fitting 104. The screw 120 is divided into three parts by longitudinal slots 122, 124 and 126, which form a Y-shaped opening configured to receive the Y-shaped partition. A piston assembly 128, formed at the end of the screw, is also composed of three segment-shaped pistons 130, 132 and 134. In this embodiment the partition divides the interior of the tube 76 into three equal, segment shaped cylinders, which can contain three different kinds of icing, each cylinder communicating with a different nozzle.

As shown in FIG. 7, in the drive unit, rotating member 136 is similar to the rotating member in FIG. 3 except that it has three inwardly directed protrusions 138, 140 and 142 fitting respectively into slots 122, 124 and 126, for rotating the screw while allowing longitudinal movement of the screw.

In FIG. 8, the three nozzle applicator 144, is shown applying icing to a cake 146 rotating on a turntable 148. The icing 150 has a rope-like shape, consists of three strings wound about one another.

As the several versions of the applicator can utilize common parts, manufacturing costs can be minimized. Moreover, the interchangeability of parts makes it possible for the user to convert easily from a single nozzle version to a multiple nozzle version. For example, the single nozzle embodiment of FIG. 1 can be converted to a two nozzle version as in FIG. 4 simply by replacing the nozzle and nozzle base of FIG. 1 with the nozzles and nozzle base of FIG. 4. Similarly the three nozzle embodiment of FIGS. 5-9 can be converted to a single nozzle version by replacement of the three nozzles and nozzle base with a single nozzle and a nozzle base having a Y-shaped partition but only a single nozzle opening.

Conversion of an applicator having two cylinders and a flat partition to an applicator having three cylinders and a Y-shaped partition can be carried out by replacing the nozzles, the nozzle base, the screw and the rotating drive member.

The applicator makes it easy to apply twisted strings of icing uniformly, and can be refilled and cleaned readily Numerous modifications can be made to the apparatus described. For example, where the interior wall of the tube 76 is in the form of a circular cylinder, the nozzle assembly and partition can be mounted for rotation relative to the tube while the tube does not rotate. If the tube rotates, its inner wall does not need to be in the form of a circular cylinder and can have any of various cross-sectional shapes as long as the interior is cylindrical. In that case it is only necessary to provide for rotation of the tube by means of suitable bearings. It is also possible to achieve simultaneous rotation of a nozzle assembly and axial translation of pistons in a configuration in which the pistons are in their own parallel cylinders separate from one another.

The apparatus can also be readily converted, by a simple interchange of parts, to a non-rotating icing applicator having an unslotted screw and no partition.

In other variations, a variable speed motor can be used, and the applicator can be operated by a battery rather than by line current. The screw can be replaced by a screw having a different thread pitch to change the rate at which icing is discharged from the nozzle or nozzles.

Various other modifications can be made to the apparatus describe without departing from the scope of the invention as defined in the following claims.

What is claimed is:

1. An applicator for extruding a semi-solid flowable material comprising:
   a nozzle assembly arranged to extrude at least one string of semi-solid flowable material, the nozzle assembly being mounted for rotation so that, by rotating, the nozzle assembly twists the string of semi-solid flowable material as the string is extruded; and
   a pump comprising a linearly movable piston for forcing, by its linear movement, said semi-solid flowable material through the nozzle assembly whereby the assembly extrudes the material;
   a pump drive mechanism connected to said pump for delivering a motive force to said piston; and
   a force-transmitting interconnection connecting said nozzle assembly and said pump, said interconnection being entirely mechanical, and transmitting said motive force through said pump to said nozzle assembly, said motive force causing said nozzle to rotate when a motive force is applied to the pump by said pump drive mechanism to operate the linearly movable piston.

2. An applicator for extruding a semi-solid flowable material comprising:
   a nozzle assembly arranged to extrude at least one string of semi-solid flowable material, the nozzle assembly being mounted for rotation through multiple complete rotations so that, by rotating, the nozzle assembly twists the string of semi-solid flowable material as the string is extruded;
   a pump for forcing said semi-solid flowable material through the nozzle assembly whereby the nozzle assembly extrudes the material; and
   a rotatable member, a first force-transmitting connection from said rotatable member to the pump for transmitting operating force for the pump from said rotatable member to the pump, said first connection being entirely mechanical, and a second force-transmitting connection from said rotatable member to the nozzle assembly, for transmitting operating force from said rotatable member to the nozzle assembly for rotating the nozzle assembly, said second connection also being entirely mechanical, the nozzle assembly and the pump being operable simultaneously through multiple complete rotations of the nozzle assembly in response to rotation of said rotatable member.

3. An applicator for extruding a semi-solid flowable material comprising:
   a nozzle assembly having at least one discharge opening, the nozzle assembly being mounted for rotation about a discharge axis, and each said discharge opening being oriented to discharge flowable material along said discharge axis;
   a pump comprising, for each said discharge opening, a cylinder in communication with said discharge opening and a piston movable in said cylinder for exerting pressure on flowable material therein to cause said material to be discharged through said discharge opening;
   a pump drive comprising a screw and nut having mating threads, said screw and nut being rotatable relative to each other wherein the screw extends along a screw axis, the pump drive being connected to each said piston for moving the piston in its cylinder in response to movement of said screw and nut relative to each other along the screw axis; and
   a rotatable member, an entirely mechanical force-transmitting connection connecting said rotatable member to said nozzle assembly and to said pump drive, for simultaneously imparting rotation to said nozzle assembly and imparting rotation to said screw and nut relative to each other, whereby the nozzle assembly rotates as flowable material is discharged through each said discharge opening thereof, thereby imparting a twist to the flowable material as said material is discharged.

4. An applicator according to claim 3, wherein the screw of the pump drive is coupled to the nozzle assembly so that the screw rotates with the nozzle assembly.

5. An applicator according to claim 3, wherein the screw axis is aligned with the discharge axis.

6. An applicator according to claim 3, wherein the housing has first and second opposite ends, the first end being located adjacent said discharge opening, and wherein the nozzle assembly is removably connected to said first end of the housing.

7. An applicator according to claim 3, wherein the nozzle assembly has at least two discharge openings.

8. An applicator according to claim 7, wherein said discharge openings are oriented for discharge of flowable material in oblique relation to, said discharge axis.

9. An applicator according to claim 7, wherein the discharge openings are formed in plural nozzles, and each of said plural nozzles is angularly adjustable.

10. An applicator for extruding a semi-solid flowable material comprising:
    a nozzle assembly having at least one discharge opening, the nozzle assembly being mounted for rotation about a discharge axis, and each said discharge opening being oriented to discharge flowable material along said discharge axis;

a pump comprising, for each said discharge opening, a cylinder in communication with said discharge opening and a piston movable in said cylinder for exerting pressure on flowable material therein to cause said material to be discharged through said discharge opening;

a pump drive comprising a rotatable screw and nut having mating threads, said screw and nut being rotatable relative to each other wherein the screw extends along a screw axis, the pump drive being connected to each said piston for moving the piston in its cylinder in response to movement of said screw and nut relative to each other along the screw axis; and a rotatable member, mechanically connected to said nozzle assembly and to said pump drive, for simultaneously imparting rotation to said nozzle assembly and imparting rotation to said screw and nut relative to each other, whereby the nozzle assembly rotates as flowable material is discharged through each said discharge opening thereof, thereby imparting a twist to the flowable material as it is discharged:

the screw axis coincides with the discharge axis;

the screw extends axially within a rotatable housing having a cylindrical, inner wall coaxial with the screw;

the nozzle assembly is located at one end of the housing and is rotatable with the housing;

a portion of the screw extending from a first end thereof is longitudinally divided into at least two parts whereby adjacent parts of the screw are separated by a space composed of at least one longitudinal slot;

a partition extends along the direction of the discharge axis into said space and has edges meeting the inner wall of the housing, whereby the partition and the inner wall of the housing cooperate to form sector-shaped cylinders, each constituting a cylinder of the pump;

each said piston is constituted by a divided part of the first end of the screw;

the screw is rotatable by said rotatable member and axially movable along the partition; and the rotatable member imparts rotation to the nozzle assembly by rotating the partition.

11. An applicator according to claim 10, wherein the inner wall of the rotatable housing is in the form of a circular cylinder.

12. An applicator according to claim 10, wherein the partition has a Y-shaped cross-section, and divides the interior of housing into three sector-shaped cylinders, and wherein the screw is divided longitudinally into three parts, one of said three parts extending into each of said three sector-shaped cylinders.

13. An applicator according to claim 10, wherein the housing has first and second opposite ends, the first end being located adjacent said discharge opening, wherein the nozzle assembly is removably connected to said first end of the housing, and wherein said partition is fixed to the nozzle assembly.

14. An applicator according to claim 10, wherein the nozzle assembly has at least two discharge openings, and wherein each of said cylinders is in communication with a different one of said discharge openings.

* * * * *